(No Model.)

J. H. CRANSTON.
BACK-UP MOTION FOR PRINTING PRESSES.

No. 448,938. Patented Mar. 24, 1891.

Attest
F. H. Schott
Wm. L. Boyden

Inventor
John H. Cranston
per Fred E. Tasker
Atty

UNITED STATES PATENT OFFICE.

JOHN H. CRANSTON, OF NORWICH, CONNECTICUT.

BACK-UP MOTION FOR PRINTING-PRESSES.

SPECIFICATION forming part of Letters Patent No. 448,938, dated March 24, 1891.

Application filed December 8, 1890. Serial No. 373,918. (No model.)

*To all whom it may concern:*

Be it known that I, JOHN H. CRANSTON, a citizen of the United States, residing at Norwich, in the county of New London and State of Connecticut, have invented certain new and useful Improvements in Back-Up Motions for Printing-Presses; and I do hereby declare the following to be a full, clear, and exact description of the invention, such as will enable others skilled in the art to which it appertains to make and use the same.

My present invention has reference to certain improvements in back-up motions for printing-presses, or more particularly in brakes or reversing mechanism therefor, the object being to provide a simple and efficient contrivance for stopping with promptitude the revolutions of the impression-cylinder and reversing or setting the same back to any desired point when required.

The invention consists, essentially, in the construction and combination of mechanical parts, substantially as hereinafter described and claimed, for applying friction to the periphery of a fast pulley on the driving-shaft after the belt has been shifted therefrom to a loose pulley on the same shaft, whereby the motion of the fast pulley derived from the momentum of the balance-wheel and impression-cylinder is promptly arrested and the impression-cylinder stopped at once through intermediate gearing, or set back to any desired point for starting again without liability of passing across the type or spoiling the sheets; and, further, it comprises certain details in the construction, combination, and arrangement of the several parts, substantially as will be described and claimed.

Figure 1:
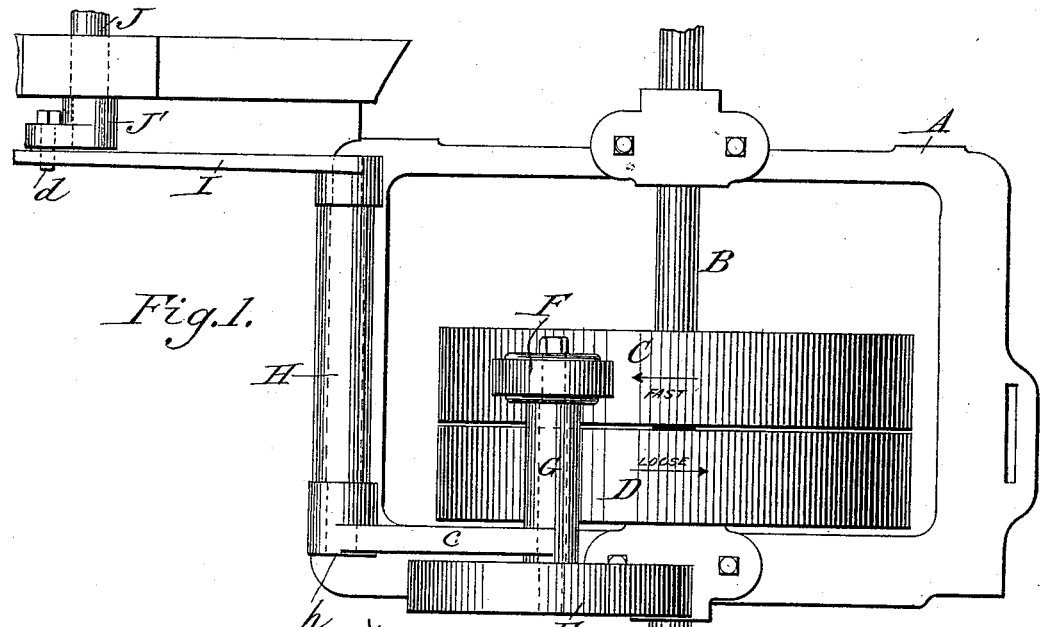
Figure 2:
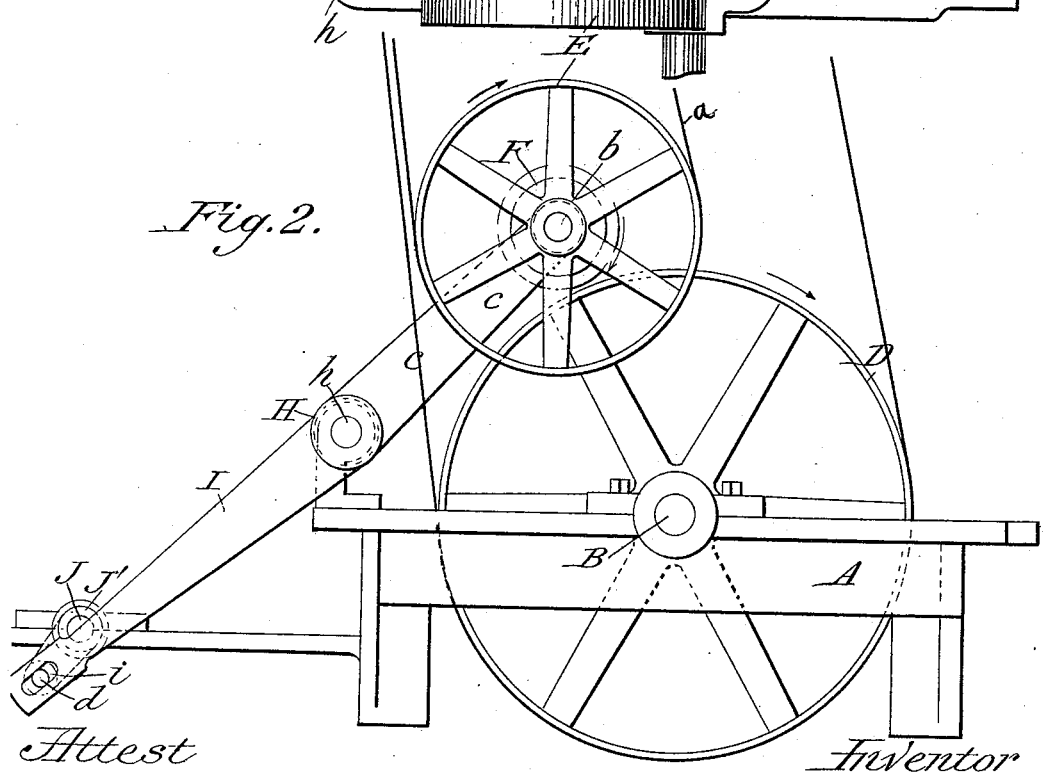

In the accompanying drawings, illustrating my invention, Figure 1 is a plan view of a portion of a printing-press or other machine with my improved mechanism for stopping or reversing the cylinder arranged in connection therewith. Fig. 2 is a side elevation of the same.

Like letters of reference designate like parts in both figures.

A designates a portion of the frame-work of an ordinary cylinder-press or other machine.

B indicates the drive-shaft, on which are the pulleys or driving-wheels C and D, C being the fast pulley and D the loose pulley. By shifting a belt which connects with a counter-shaft or suitable motor from one of these pulleys to the other the shaft B may be rotated or not, at pleasure. In order to apply friction to the periphery of the fast pulley after the driving-belt has been shifted from said pulley onto the loose pulley, I provide an oscillating or vibrating frame carrying a frictionally-acting wheel, which is adapted to bring its periphery into contact with the periphery of the fast pulley, and thus impart to the latter a braking or reversing action.

E denotes a wheel or pulley, around which passes a belt $a$, running from a counter-shaft or other overhead arrangement, so that said pulley E may be given a constant positive rotation. The pulley E is securely fastened upon one end of a horizontal shaft $b$, which shaft carries at its other end a small friction-wheel F, located directly opposite the periphery of the fast pulley C and adapted to touch the latter or be thrown out of contact therewith, which connection or disconnection is easily accomplished at any time when desired by a slight vibration of the wheel. The shaft $b$ is carried in a horizontal tubular box or bearing G, carried by an arm $c$, which in turn is made integral with or securely connected to one end of another horizontal tubular bearing H, which is supported upon a shaft $h$, running through it, on which the horizontal bearing H oscillates as a pivot, said part H carrying at its other end an arm I, provided, preferably, with a slot $i$, which receives a pin $d$ on one end of a crank J' on shaft J, which shaft may be provided with any suitable contrivance for imparting thereto either by hand or foot power a movement sufficient to vibrate the frame that carries the frictionally-acting wheel enough to apply said wheel to the fast pulley or remove it therefrom, accordingly as may be desired. It will thus be seen that I furnish a frictionally-acting wheel adapted to come into contact with the periphery of the fast pulley, which wheel is driven independently at all times with a constant rotation, which direction of rotation is opposite to that of the fast pulley. There is thus no connection between the fast and loose pulley and no transmission of power from the loose pulley to the fast pulley; but my device is an independent braking or reversing contrivance consisting, essentially, in a vibrating frame carrying a positively-driven frictionally-acting wheel, which is adapted to be applied to the periphery of the fast pulley.

The operation of the device will be as follows: When it is desired to stop the press and back the cylinder up to the proper place to start again, the driving-belt will be shifted by means of a suitable belt-shifter from the fast pulley C to the loose pulley D, and then, in order to overcome the momentum of the cylinder of the printing-press and the balance-wheel and bring the press to a stop or reverse it, the operator will oscillate the frame which carries the wheel F, so as to cause said wheel F to bear upon the periphery of the fast pulley, and as soon as a contact takes place between them the motion of the wheel F, consequent upon its actuation through pulley E and belt a, will be transmitted to the fast pulley C, and thus to the shaft B and the printing-cylinder, and thus the fast pulley C will be retarded and finally stopped and then reversed or rotated backward until the cylinder has been backed up to the proper place to start again. Of course the device may be used, if preferred, as a simple brake instead as a back-up motion.

Of course many changes may be made in the details of the construction of the vibrating frame which carries the friction-wheel; also, the invention is applicable to other kinds of machinery as well as printing-presses. I therefore reserve the liberty of varying the construction and arrangement of the parts and the application of the invention to suit the exigencies and demands of various cases without departing from the invention.

Having thus described my invention, what I claim as new, and desire to secure by Letters Patent, is—

1. In an apparatus for stopping and reversing machinery, the combination, with the driving-shaft and the fast and loose pulleys, of a vibrating frame carrying a shaft provided with a frictionally-acting wheel, and means whereby said shaft may be driven with a constant positive rotation by suitable power independent of the fast and loose pulleys, said frictional wheel being adapted by the vibration of its frame to be brought into contact at certain times with the fast pulley, substantially as described.

2. The combination, with the driving-shaft and the fast and loose pulleys, of a vibrating frame carrying a shaft which is provided at one end with a pulley belted to a suitable driving power and at the other end with a frictionally-acting wheel adapted to be brought into contact with the periphery of the fast pulley, which frictionally-acting wheel is thus kept constantly rotating and is designed to stop or reverse the fast pulley, substantially as described.

3. The combination of the frame of the printing or other machine, the driving-shaft, the fast and loose pulleys thereon, the vibrating frame having the tubular bearing G, the shaft b, carried in said tubular bearing, the pulley E on one end of said shaft, and the wheel F on its other end, said pulley E being kept constantly rotated by means of belt a and said wheel F being adapted to be applied to the periphery of the fast pulley, substantially as described.

4. The combination of the frame A, the drive-shaft B, fast and loose pulleys C D, carried thereon, the vibrating frame consisting of the pivoted part H, having arms I and c, said arm c carrying tubular bearing G, the shaft b in said bearing, pulley E on one end of said shaft actuated by the belt a and the wheel F on the other end thereof, adapted to be brought into contact with the periphery of the fast pulley C, substantially as described.

In testimony whereof I affix my signature in presence of two witnesses.

JOHN H. CRANSTON.

Witnesses:
  LUCIUS BROWN,
  GEO. A. PRATT.